United States Patent

Ogasawara et al.

[11] Patent Number: 6,081,289
[45] Date of Patent: *Jun. 27, 2000

[54] INTENSITY CONTROL UNIT FOR IMAGE FORMING APPARATUSES

[75] Inventors: Yoshimi Ogasawara, Yokohama; Eihiro Sakaki, Choufu, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/378,732

[22] Filed: Jan. 26, 1995

[30] Foreign Application Priority Data

Jan. 31, 1994 [JP] Japan ................................. 6-010073
Nov. 10, 1994 [JP] Japan ................................. 6-276480

[51] Int. Cl.⁷ ................................. B41J 2/47; B41J 4/435; G02B 26/02; G02B 27/72
[52] U.S. Cl. ................................................................. 347/246
[58] Field of Search ................................. 347/247, 246, 347/234, 232, 235, 236, 253, 248; 399/51

[56] References Cited

U.S. PATENT DOCUMENTS

| | | | |
|---|---|---|---|
| 4,087,672 | 5/1978 | Yi | 347/246 |
| 4,746,987 | 5/1988 | Traino et al. | 347/247 |
| 5,043,745 | 8/1991 | Inoue et al. | 347/246 |
| 5,059,987 | 10/1991 | Takeyama et al. | 347/247 |
| 5,087,928 | 2/1992 | Okino | 347/234 |

*Primary Examiner*—John Barlow
*Assistant Examiner*—Raquel Yvette Gordon
*Attorney, Agent, or Firm*—Fitzpatrick, Cella, Harper & Scinto

[57] ABSTRACT

A method of controlling the intensity of scanning light in a color image forming apparatus in which a photosensitive member is scanned with light modulated according to an image signal, comprises: a first step of turning on a light source of scanning light in order to illuminate at least the whole of one main scanning line before image formation based on the first color component, and controlling the light source according to the intensity of scanning light; a second step of controlling the light source according to the intensity of scanning light during scanning of a non-image scanning area before the image formation based on the first color component and after the intensity control of the first step; and a third step of controlling the light source according to the intensity of scanning light during scanning of a non-image scanning area between two cycles of image formation based on a color component.

49 Claims, 11 Drawing Sheets

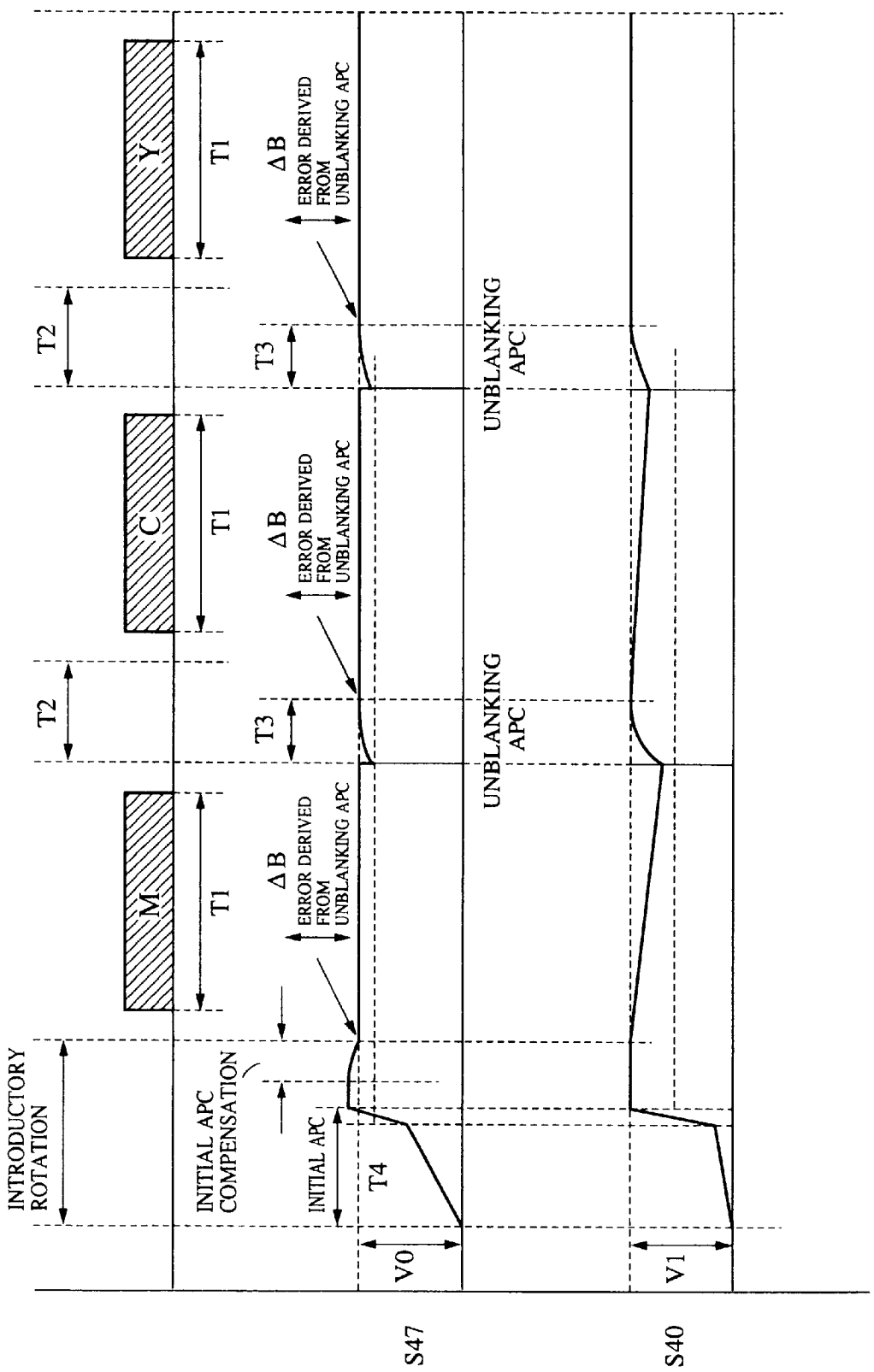

FIG. 4(a) EQUAL
FIG. 4(b) HIGHER
FIG. 4(c) LOWER

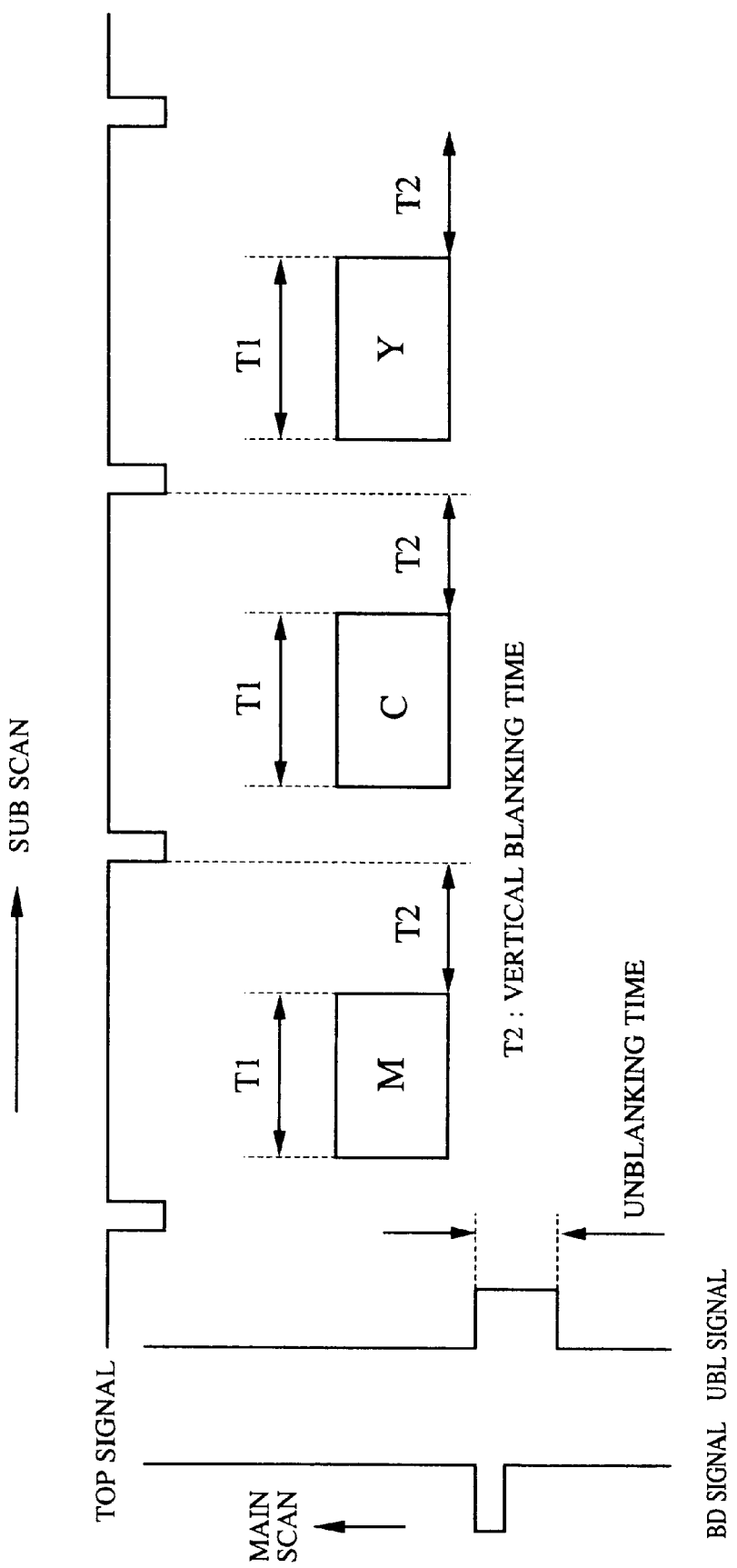

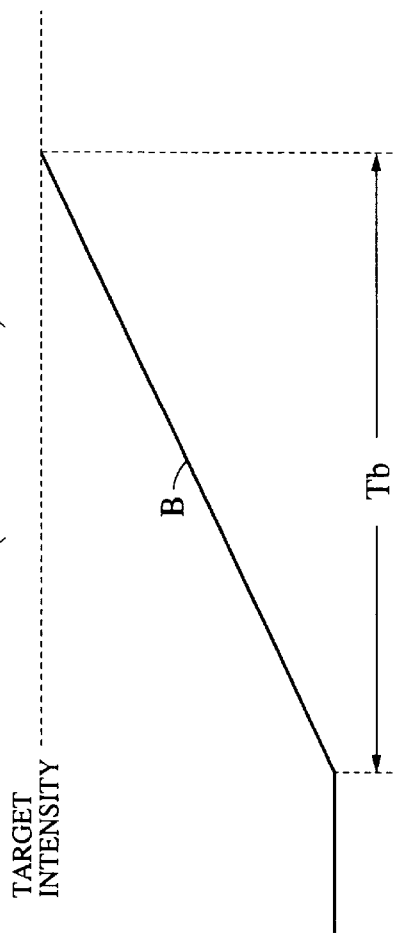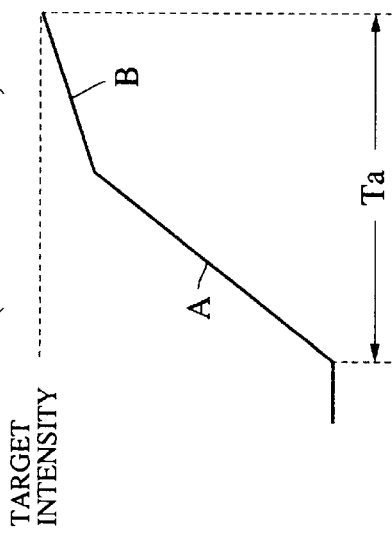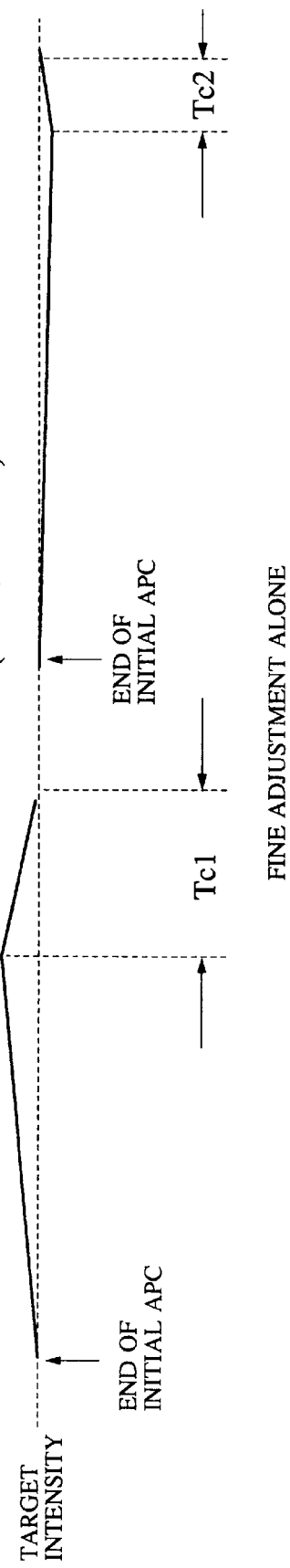

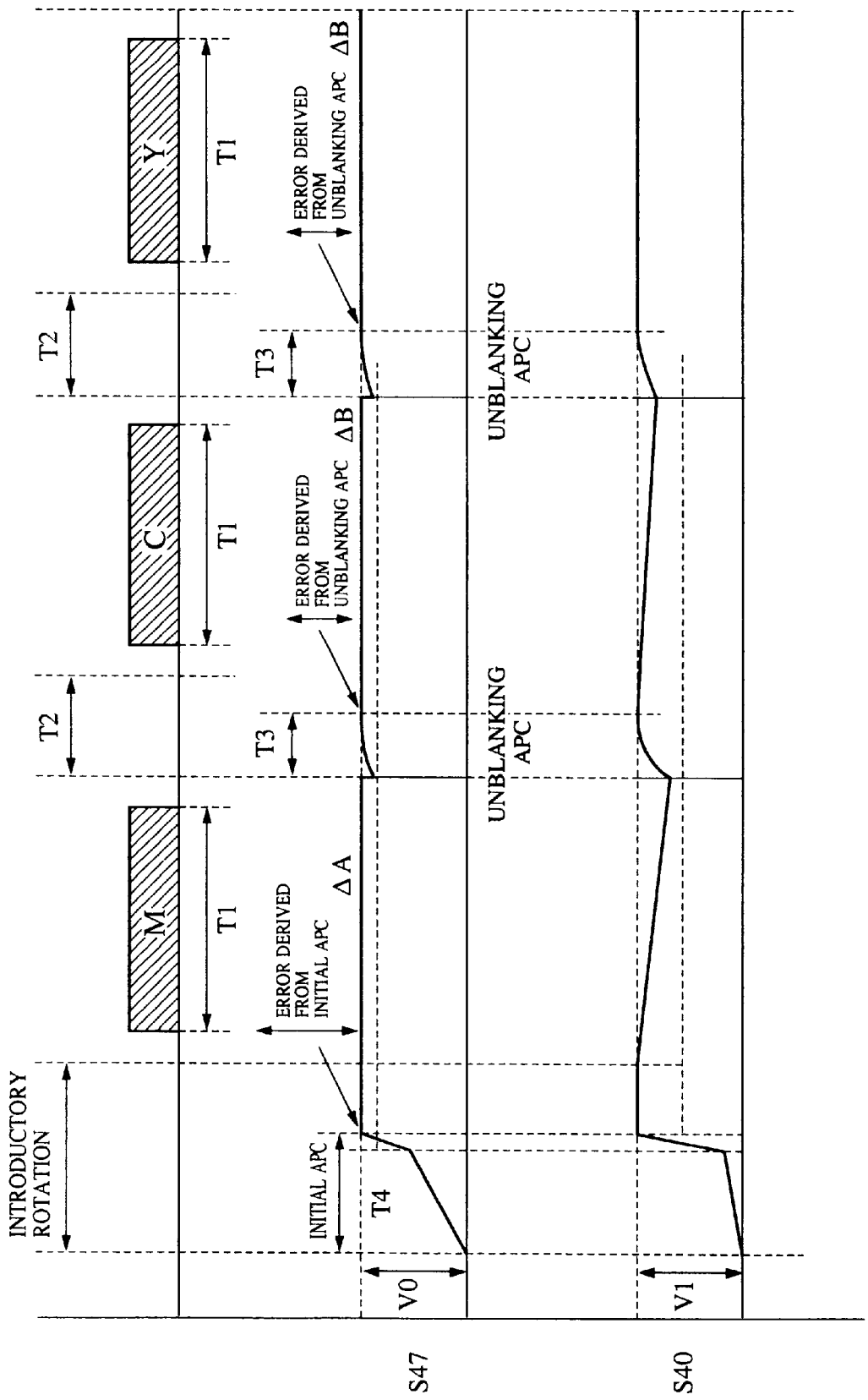

ns for Image

INTENSITY CONTROL UNIT FOR IMAGE FORMING APPARATUSES

BACKGROUND OF THE INVENTION

1. Field of the Invention

The present invention relates to an intensity control unit for controlling intensity of light emitted from a light source such as a semiconductor laser and to an image forming apparatus using such an intensity control unit.

2. Description of the Related Art

An electrophotography-type color laser printer or the like employs a semiconductor laser as a means for forming a electrostatic latent image on a photosensitive drum according to an image signal.

FIG. 5 shows an overall structure of an example of a single-drum multi-transfer color laser printer. In FIG. 5, paper 102 supplied from a paper feeder 101 has a tip thereof gripped by a griper 103f of a transfer drum 103 and is retained along the outer circumference of the transfer drum 103.

Latent images of different colors formed on a photosensitive drum 1 by an optical unit 107 are developed by color developing mechanisms Dy, Dc, Dm, and Db, respectively from yellow, cyan, magenta, and black coloring agents, and thereafter transferred onto paper wound around the outer circumference of the transfer drum 103. Thus, a multicolor image is produced. Thereafter, the paper 102 is separated from the transfer drum 103, fused by a fusing unit 104, and ejected to a paper discharge tray 106 by an ejector 105.

Each of the color developing mechanisms is supported for rotation an axis of rotation, and all of the color developing mechanisms are held by a developing mechanism selector 108 that can rotate about an axis of rotation 110 which is fixed to a housing of the printer. As shown in FIG. 5, as the developing mechanism selector 108 rotates for sequentially selecting each developing mechanism in turn, the developing mechanisms rotate around their respective axes so as to maintain a constant vertical orientation.

After a selected developing mechanism has been moved to a developing position, a selector holding frame 109 is pivoted toward the photosensitive drum around vertex 109b by means of a solenoid 109a, thereby positioning the developing mechanism selector 108 together with the developing mechanisms. A detector 4 detects a home position of the developing mechanism selector 108 by detecting a projection H projecting from the circumference of the developing mechanism selector 108.

A printer control unit that is not shown recognizes the positions of the color developing mechanisms using the projection H as a reference, determines an angle of rotation to be made by the developing mechanism selector 108, and then selects a desired developing mechanism.

For image formation lighting in the printer having the foregoing structure, light emanating from a laser beam scanner is utilized to form latent images on photosensitive drum 1.

An image formation lighting means shown in FIG. 6 is an example incorporated in the optical unit 107 shown in FIG. 5. A laser beam scanner serving as an image exposing means has a semiconductor laser 41. Light emanating from the semiconductor laser 41 is modulated according to color components of an image signal. A laser beam emitted by the semiconductor laser 41 is deflected by a rotary polygon mirror 38 via a collimator lens 31 and a cylindrical lens 32, imaged by an f-θ lens composed of a spherical lens 33 and a toric lens 34, turned back by a reflector mirror 35, and then irradiated to the photosensitive drum 1. The laser beam is then scanned over the surface of the photosensitive drum 1 in a given direction (indicated by arrow "a") at a certain speed. Thus, an image is produced according to the color components of the image signal. Part of the laser beam is reflected by a horizontal synchronization mirror 36. An index signal (sometimes called a "beam detect" or "BD" signal) indicating a start direction of a scanning line made by the laser beam is detected through optical fibers 37. Using the signal as a reference, timing of writing an image along one scanning line is determined.

FIG. 7 is a block diagram concerning intensity control executed by a laser drive circuit employed in the optical unit 107. In FIG. 7, reference numeral 41 denotes a semiconductor laser identical to the one shown in FIG. 6. 40 denotes a laser unit, which is composed of the semiconductor laser 41 and a photodiode 42 located in the vicinity of the semiconductor laser 41. Part of the laser beam emanating from the semiconductor laser 41 is received by the photodiode 42, thus providing a signal S40 whose level is proportional to the intensity of the laser beam. Next, the signal S40 is compared in signal level with a reference signal Vt representing a predetermined target value of intensity.

Then, an output signal S44 of a signal comparator 44 is supplied as a signal whose level corresponds to an error in level between the signals S40 and Vt. The control circuit 45 supplies a counting control signal S45 to a counter 46 according to the error signal S44.

Next, the counter 46 counts up or down pulses in response to the control signal S45, and supplies a count signal S46 to a D/A converter 47. The D/A converter 47 converts the digital signal S46 into an analog signal S47. The signal S47 is then supplied to a laser drive circuit 48 (which is also depicted in FIG. 6). The laser drive circuit 48 also receives a signal S1. The signal S1 is an image signal supplied from an image signal control unit that is not shown.

The laser drive circuit 48 specifies the intensity of a laser beam according to the signal S47, generates a laser drive signal S48, which controls the on or off operation of a laser, using the image signal S1, and supplies the signal S48 to the semiconductor laser 41.

The above process of stabilizing the intensity of light emanating from the semiconductor laser 41 and confining it to a given range is referred to as automatic power control which shall be written hereinafter as "APC".

A circuit for stabilizing the intensity of light emanating from a laser is incorporated in the optical unit 107, because the temperature characteristic of the laser is very poor. In an environment of a varying ambient temperature, APC is essential for stabilizing the intensity of light emanating from a laser.

A direction in which a laser beam scans the photosensitive drum 1 (indicated with arrow "a" in FIG. 6) is ordinarily called a "main scan" direction and a direction in which the photosensitive drum 1 rotates (indicated with arrow "b" in FIG. 6) is ordinarily called a "sub scan" direction. APC is carried out in non-print (or imaging) areas in the main and sub scan directions. More particularly, the non-print periods during which the non-print areas are scanned are classified into pre-processing periods each preceding initial image formation, vertical blanking periods each occurring between sheets of print paper (also between colors in multicolor printing mode), and horizontal blanking periods each occurring between print lines.

Ideally, APC should be carried out over all the non-print areas. During APC, the semiconductor laser 41 is forced to emit light. For a longer service life of the laser, APC is executed during any time interval within a non-imaging period which is dependent on a printer.

APC to be performed during the pre-processing period shall be referred to as initial APC. APC to be performed during the horizontal blanking (hereinafter, referred to as unblanking) period occurring between sheets of print paper (also between colors) shall be referred to as unblanking APC.

FIG. 8 shows timing of executing unblanking APC. In FIG. 8, a TOP signal is a signal to be sampled every time the transfer drum 103 rotates to a given position. The TOP signal serves as a vertical-sync signal for an image signal. A BD signal is a reference signal indicating a start line of writing print paper. The BD signal serves as a horizontal-sync signal for the image signal. An UBL signal is a signal that becomes active during an unblanking period alone within main scanning. When the UBL signal is active, unblanking APC is executed. Unblanking APC is executed during the unblanking (horizontal blanking) period within a T2 time interval in FIG. 8.

Next, referring to FIG. 7, actual APC will be described in terms of a non-print period and a print period.

To begin with, during a non-print period, the semiconductor laser 41 is turned on forcibly for a given APC period. Control is then passed as mentioned below. A signal S40 whose level is proportional to the intensity of light emanating from the laser which is detected by the photodiode 42 is fed to the signal comparator 44, and compared with a reference signal Vt representing a target value of intensity. The subsequent operation depends on the result of comparison.

Specifically, if the result of comparison reveals that the detected intensity equals to the target value, a request signal S44 requesting for retention of a current laser drive signal is supplied to the control circuit 45 in order to latch the output signal S47 (current state) of the D/A converter 47. On the other hand, if the result of comparison reveals that the detected intensity does not equal the target value, a request signal S44 requesting for increase or decrease, as appropriate, of the intensity is supplied to the control circuit 45. For example, when the detected intensity exceeds the target value, a request signal S44 requesting for decrease of the intensity of light is supplied to the control circuit 45. In response to a control signal S45 sent from the control circuit 45 to the counter 46, the counter 46 counts up or down pulses and supplies a count signal S46 composed of a plurality of bits to the D/A converter 47. The D/A converter 47 then converts the input signal S46 into a laser drive signal S47 of analog form. The laser drive signal S47 is then supplied to the laser drive circuit 48, thus changing the intensity of light emanating from the semiconductor laser 41. Thereafter, the foregoing control sequence is repeated until the detected signal S40 sent from the photodiode 42 approaches in level the reference signal Vt representing a target value of intensity.

During a print period, the control circuit 45 instructs the counter 46 to stop counting and supplies a control signal S45 so as to trigger latching. Thus, the laser drive signal S48 confined to a certain range by performing APC during a non-print period is retained. During the print period, the intensity of light emanating from a laser is therefore held at a value attained by performing APC immediately before printing. This results in stable print density.

However, there are differences in measurement conditions between when initial APC is performed and when unblanking APC is performed. These differences result in a different error derived from the different APC's.

(1) First, there is a difference in forced light emission time between initial APC and unblanking APC, which causes a difference in stability of the intensity of light emanating from a laser.

That is, during initial APC, light is emitted forcibly throughout at least one main scanning line including an effective print area in order to search for a reference signal indicating a start line of writing print paper (BD signal). In contrast, during unblanking APC, since the BD signal is already detected, light is emitted forcibly only for a given period of time (horizontal unblanking period) preceding or succeeding the BD signal.

Unblanking APC involves several main scanning lines until APC is completed. Light is emitted forcibly during the horizontal unblanking period alone. During a sub scan period, therefore, forced light emission is repeated pulsatively. Thus, unblanking APC differs from initial APC in which light is emitted forcibly during both the main and sub scan periods. FIGS. 9(a) and 9(b) show these relationships. A period during which an UBL signal is active low corresponds to a period during which a laser is forced to emit light due to APC. FIG. 9(a) shows timing of executing a sub scan. FIG. 9(b) shows timing of executing a main scan. A period during which a masking signal is active (or "high") corresponds to a period during which an effective print area is scanned.

(2) Second, there is a difference in non-print time required for starting subsequent printing between initial APC and unblanking APC.

That is, it takes a longer time (FIG. 9(a)) interval to start subsequent printing after initial APC. There is a higher probability that the intensity of light emanating from a laser for printing varies after completion of APC.

(3) Third, initial APC starts in a state in which a laser has not emitted light at all; that is, a laser drive control signal S46 is cleared. On the contrary, unblanking APC starts with a count value attained at the end of the previous APC.

This relationship is illustrated in FIGS. 10(a) through 10(c). In FIG. 10(c), image formation for the first page starts from the end of initial APC to the starting time of period TC1, TC2, and unblianking APC takes place in appropriate intervals during TC1, TC2.

In general, during initial APC, as shown in FIG. 10(a), coarse adjustment (intensity control plotted as A in FIG. 10(a)) in which a count value is changed by several bits and fine adjustment (intensity control plotted as B in FIG. 10(a)) in which a count value is changed by one bit alone are combined in order to reduce initial APC time. Specifically, coarse adjustment is carried out until the intensity of light emanating from a laser reaches a given value close to a target value of intensity represented by the reference signal Vt. Fine adjustment is then carried out until the intensity changes from the given value to the target value. In contrast, since unblianking APC is started with the intensity of light emanating from a laser attained at the end of the previous APC, fine adjustment alone is carried out. Thus, initial APC and unblanking APC use different APC tracking techniques.

When initial APC is achieved, as shown in FIG. 10(b), by performing fine adjustment alone, the same technique as the one followed by unblanking APC can be employed as shown in FIG. 10(c). However, an initial APC period Tb is longer than an initial APC period Ta as shown in FIGS. 10(a) and 10(b). Thus, initial APC including fine adjustment alone is impractical because of the long APC period. Besides, an image signal to be printed is supplied with a time lag. This causes an operator to wait for a prolonged period of time.

(4) Fourth, no consideration is taken into a droop characteristic (described below) of a laser. Therefore, since there is a difference in control sequence between initial APC and unblanking APC as described in items (1) to (3), even if light emission current to be fed to a laser element at the completion of APC is the same between initial APC and unblanking APC and light is emitted with the measured current, the intensity of light at the completion of APC differs between initial APC and unblanking APC.

"Droop characteristic" refers to the fact that, when a semiconductor laser is driven, the temperature at a junction in a laser element varies with the intensity and duration of light due to transitional heat resistance in the laser element. That is to say, when light is emitted initially, the temperature at a junction is low and the efficiency in light emission is therefore excellent. With an increase in the temperature at a junction due to self-generated heat, the efficiency in light emission deteriorates.

When initial APC is performed or light is emitted continuously, the efficiency in light emission is poorer than that when unblanking APC is performed or light is emitted for a short period of time. The intensity of light therefore differs between initial APC and unblanking APC despite the same drive current. As a result, even if the laser drive current is set for initial APC and unblanking APC in order to attain the same target intensity of light, the intensity of light for forming an image differs between initial APC and unblanking APC.

FIG. 11 shows timing of executing initial APC and unblanking APC for a multi-rotation color printer. In FIG. 11, T1 denotes an effective print period during which one sheet of print paper is printed. T2 denotes a vertical blanking period occurring between colors. T3 denotes an unblanking APC period. T4 denotes an initial APC period. V0 denotes a target value of intensity of light emanating from a laser. Vt denotes a reference signal for use in controlling the intensity of light emanating from a laser. Delta A ("ΔA") denotes an error derived from initial APC. Delta B ("ΔB") denotes an error derived from unblanking APC.

Because of the aforesaid factors, there arises a problem that a difference is made in print density between the first sheet of paper (initial APC) and a subsequent sheet (unblanking APC). Furthermore, when a multi-rotation type color printer is employed, as shown in FIG. 11, a difference is made in density between the first color and the second color in one sheet of print paper.

SUMMARY OF THE INVENTION

An object of the present invention is to address the aforesaid problems.

Another object of the present invention is to provide a color recording apparatus capable of solving the aforesaid problems and quickly alleviating a variation of an error derived from initial APC.

Another object of the present invention is to prevent irregular coloring derived from intensity control in a color recording apparatus using a common light source for a plurality of color components.

A color recording apparatus in accordance with the present invention comprises a semiconductor laser and an intensity stabilizing means for stabilizing the intensity of light emanating from the semiconductor laser. The intensity stabilizing means includes a first intensity stabilizing means that stabilizes the intensity of light emanating from the semiconductor laser within a given time interval during a pre-processing period immediately preceding initial recording, and a second intensity stabilizing means for correcting the intensity of light emanating from the semiconductor laser within any time interval succeeding intensity stabilization during the pre-processing period.

In the foregoing color recording apparatus, the first intensity stabilizing means may increase the intensity of light emanating from a laser at a given rate sequentially until the intensity of light reaches a given value smaller than a target value within a given time interval during a pre-processing period immediately preceding initial recording. When the intensity of light reaches the given value, the first intensity stabilizing means calculates a set value of intensity of light required for reaching the target value according to a rate of an intensity change made by this time, and changes the intensity of light from the given value to the target value at a time according to the calculated set value of intensity.

In the above-described color recording apparatus, the second intensity stabilizing means may execute the same control sequence as the one for stabilizing the intensity of light emanating from a semiconductor laser during a non-print (or record) period in print (or record) mode.

The second intensity stabilizing means may also execute the same control sequence as the one for stabilizing the intensity of light emanating from a semiconductor laser during a non-print (or record) period during which printing (or recording) is shifted from one of a plurality of areas to another area.

In this case, the non-print period during which printing is shifted from one of a plurality of areas to another area is a non-print period during which printing is shifted from one color area to another color area in multi-rotation color print mode. In APC performed during a pre-processing period, the first intensity stabilizing means and second intensity stabilizing means compensate for an error derived from APC. Thus, a difference in density between sheets of print paper as well as a difference in density between colors in color image print mode is alleviated.

Other objects, advantages, and effects of the present invention will be further apparent from the detailed description, accompanying drawings, and claims.

BRIEF DESCRIPTION OF THE DRAWINGS

FIG. 3 illustrates an error derived from APC in accordance with the present invention;

FIG. 8 is a timing chart showing an example of timing of executing unblanking in a multi-rotation color printer;

FIG. 10 is an explanatory diagram concerning standard initial APC in conventional devices; and FIG. 11 illustrates an error derived from conventional APC.

DETAILED DESCRIPTION OF THE PREFERRED EMBODIMENTS

Figure 1:
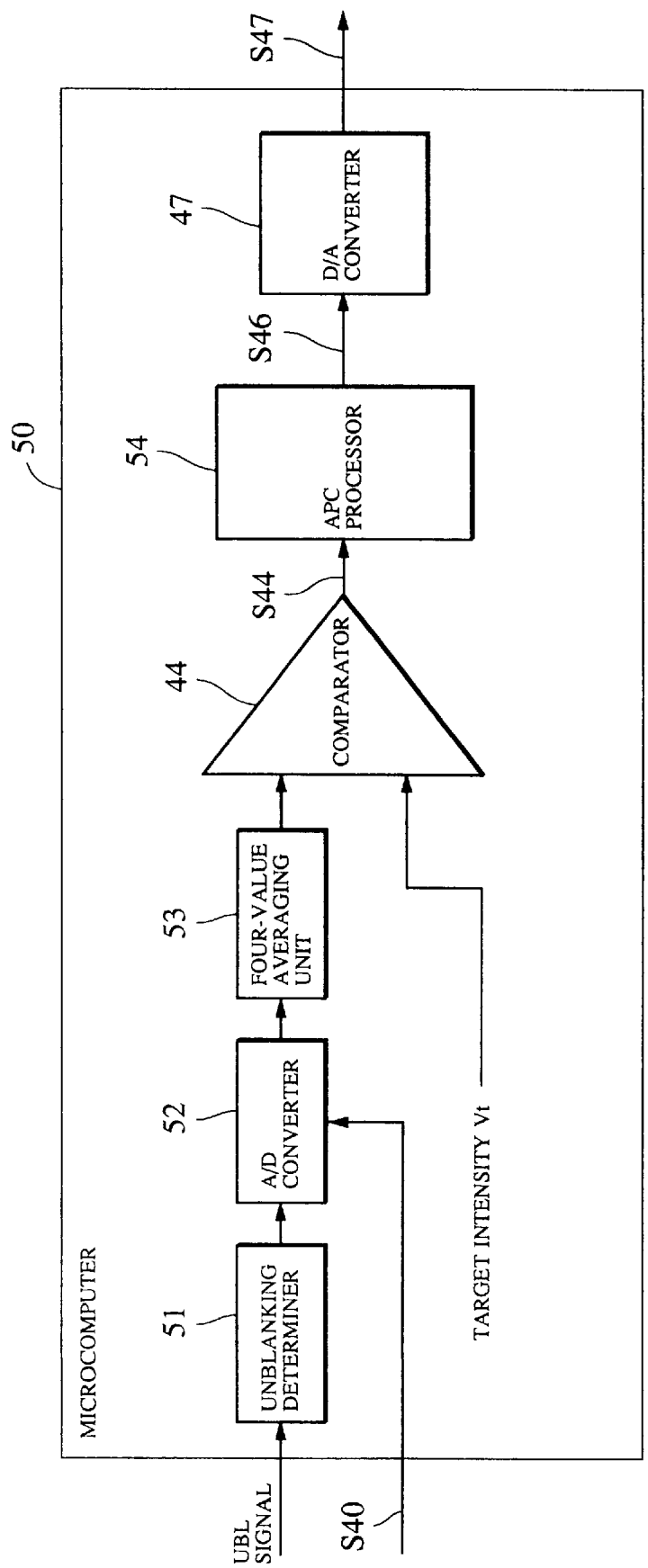
FIG. 1 is a block diagram showing an example of an intensity control circuit for a semiconductor laser in accordance with the present invention.

Referring to the drawings, an embodiment of the present invention will be described below.

Figure 5:
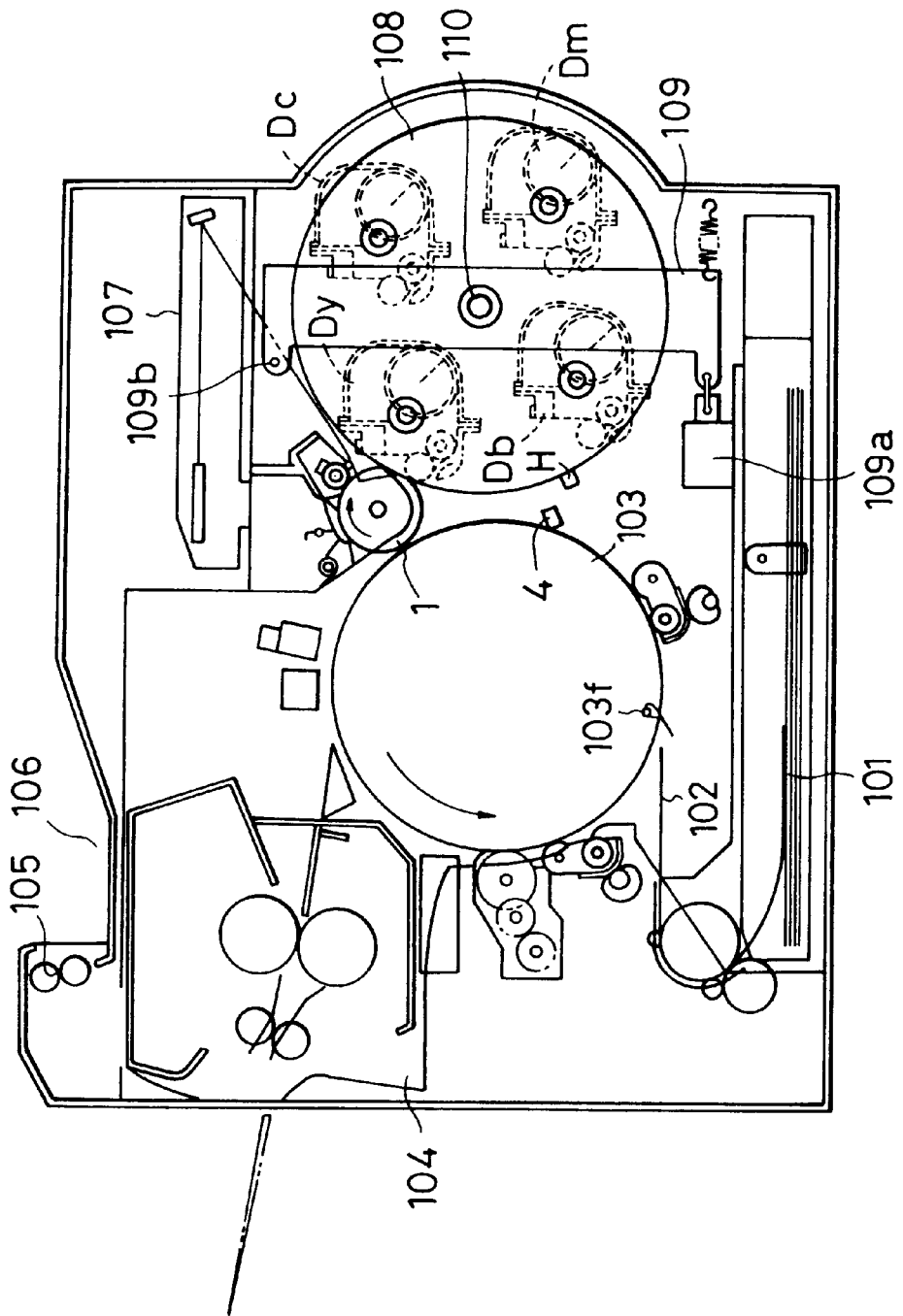
FIG. 5 is a sectional view showing an overall structure of a color printer.
Figure 6:
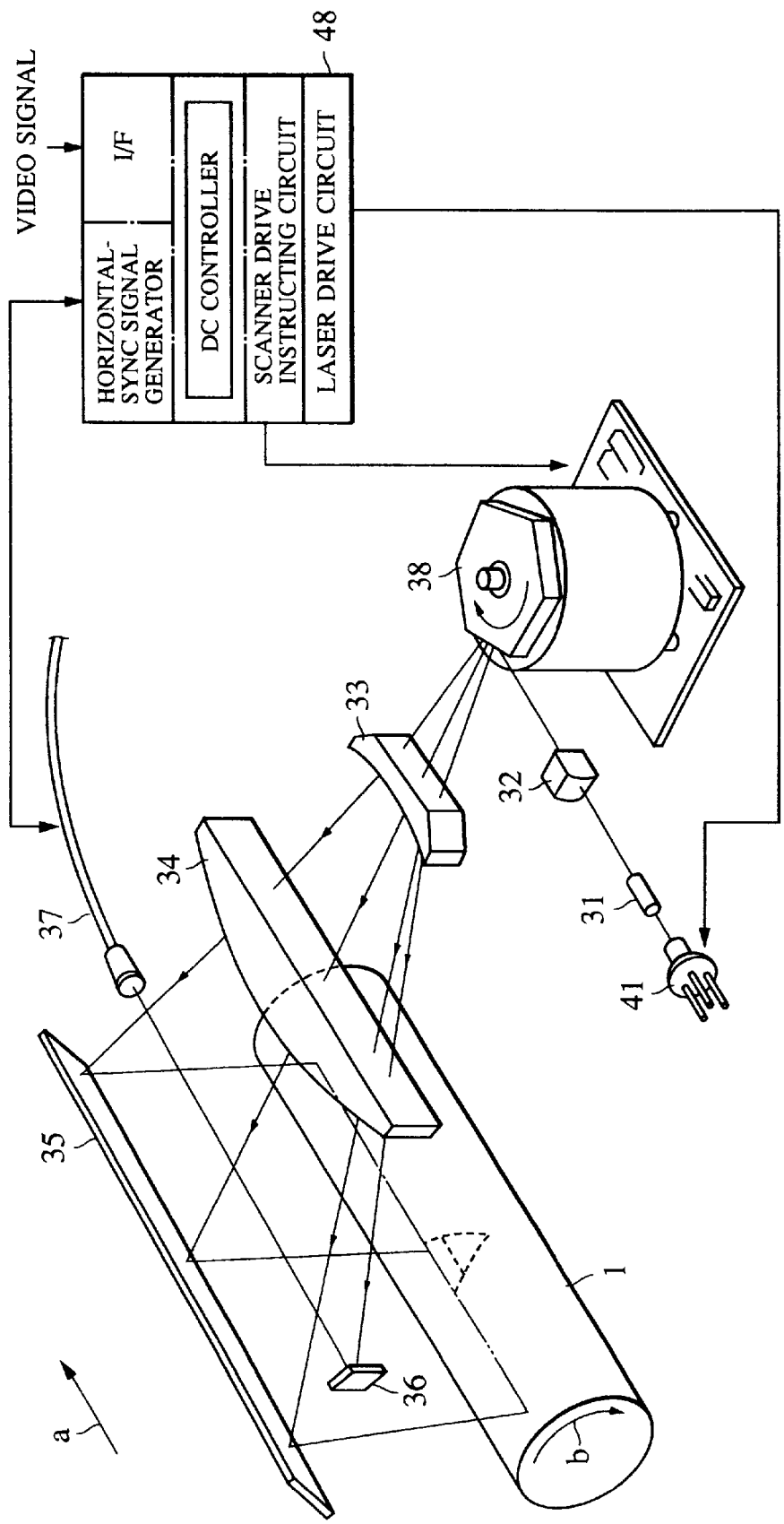
FIG. 6 shows a laser beam scanner.

In this embodiment, use is made of the structure and configuration shown in FIGS. 5 and 6, respectively, which have already been described.

Figure 7:
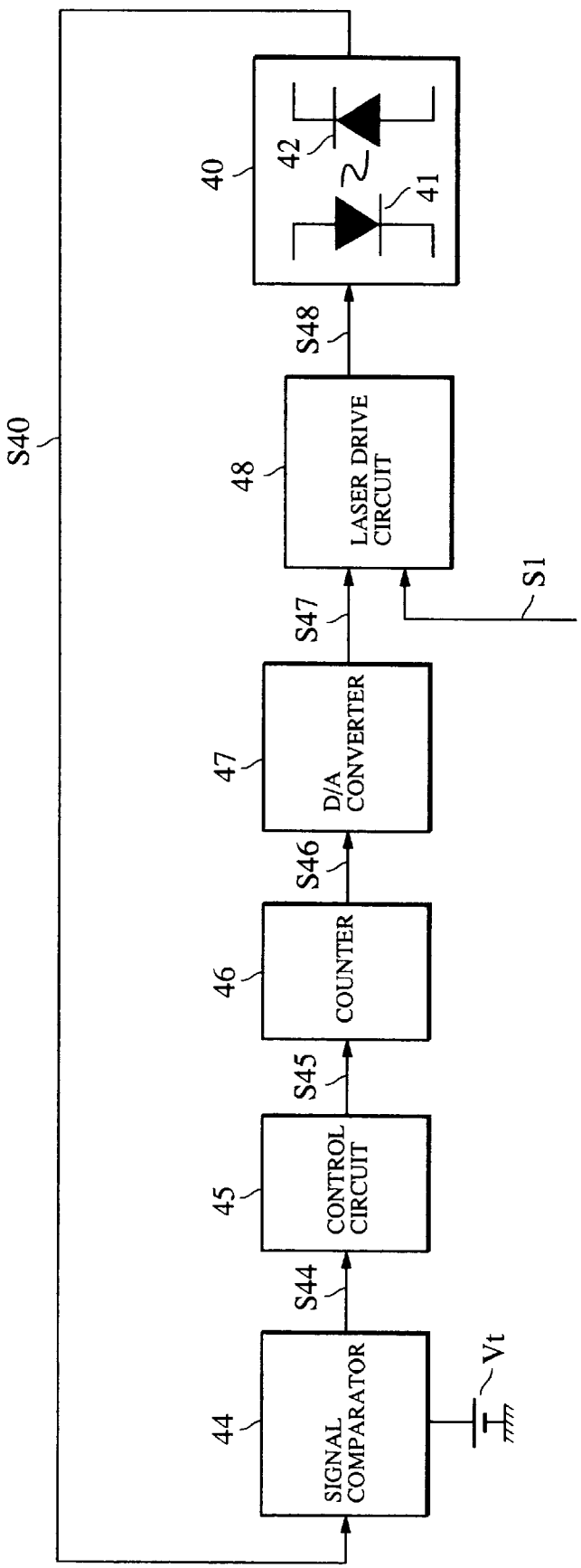
FIG. 7 is a block diagram showing a configuration of a semiconductor laser drive circuit.

FIG. 1 shows a configuration responsible for unblanking APC in the embodiment of the present invention. In FIG. 1, signals and functional blocks identical to those in FIG. 7 are assigned the same reference numerals. A signal S40 is fed to an A/D port. A period during which an UBL signal is active low corresponds, as shown in the timing chart of FIG. 3, to an unblanking period. In FIG. 1, the UBL signal is fed to an interrupt port of the microcomputer 50. When a given period of time has elapsed since an interrupt request, immediately before a detected intensity signal S40 sent through the A/D port is fetched, an unblanking determiner 51 checks and determines that unblanking is in progress, and thus activates A/D conversion during the unblanking period alone. An A/D converter 52 converts the detected intensity signal S40 of analog form into a digital form. A four-value averaging unit 53 fetches A/D-converted data four times and averages the four data values so as to remove noise. An APC processor 54 has the capabilities of the control circuit 45 and counter 46 in FIG. 7, updates a laser drive signal (digital) S46 according to a signal S44 resulting from the comparison between an output data of the four-value averaging unit 53 and a set value of target reference intensity Vt made by a comparator 44, and supplies the updated laser drive signal to a D/A converter 47.

The D/A converter 47 converts the digital data S46 supplied from the APC processor 54 into an analog signal S47, and supplies it as a laser drive current control signal to a laser drive circuit 48. The photodiode 42 located in the vicinity of the semiconductor laser 41 then supplies the detected intensity signal S40 whose level is proportional to the intensity of light emanating from the laser to the A/D port of the microcomputer 50. The aforesaid sequence is repeated until the detected intensity signal S40 has a value close to the set value of target reference intensity Vt.

Figure 2:
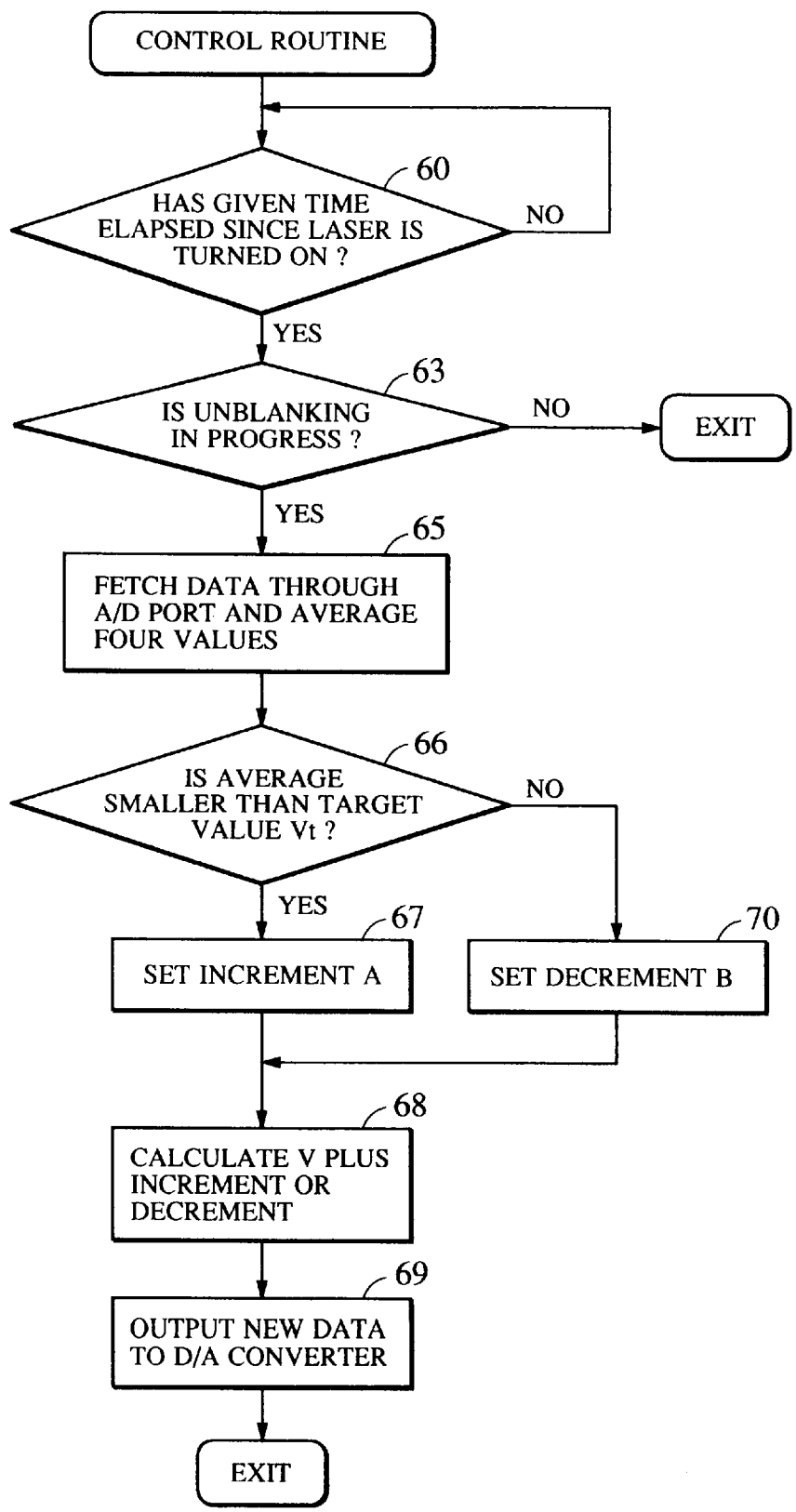
FIG. 2 is a flowchart showing an intensity stabilization sequence.

FIG. 2 is a flowchart showing an intensity stabilization sequence.

A control routine is activated with a timer interrupt in response to an UBL signal. When the control routine is called with the interrupt, first, it is determined whether the laser is on (step 60). If the result of determination reveals that the laser is off, the laser is turned on forcibly (step 61) and then the control routine is escaped. If the result of determination made at step 60 reveals that the laser is on, it is determined whether unblanking is in progress (step 63). If the result of determination reveals that unblanking is not in progress, the control routine is exited. If the result of determination reveals that unblanking is in progress, the detected intensity signal S40 sent from the photodiode 42 lying in the vicinity of the laser 41 is fetched through the A/D port, and four data values are averaged (step 65). A resultant average value is then compared with a set value of target reference intensity Vt (step 66). If the result of comparison reveals that the average value is smaller than the value Vt, an increment A is specified (step 67). A sum of V+A is then supplied as a new value represented by the laser drive signal S47 from the D/A converter 47 (steps 68 and 69). Thereafter, the foregoing sequence is repeated as long as the result of comparison reveals that the average value is smaller than the value Vt. If the result of comparison reveals that the average value exceeds the value Vt, a decrement B is specified. A sum of V+B is then supplied as a new value of the laser drive signal S47 from the D/A converter 47 (step 70). As mentioned above, four data values fetched through the A/D port are averaged. Alternatively, if the number of data values is specified, the data values may be summated.

Thus, the foregoing control sequence is repeated until the detected intensity signal S40 has a value close to the set value of target reference intensity Vt.

Unblanking APC to be performed at a step in the above sequence will be described with reference to FIGS. 8 and 9. Unblanking APC is executed when the UBL signal is active low or when vertical blanking occurs between sheets of print paper or colors. This period corresponds to a non-print period, during which the semiconductor laser 41 is turned on forcibly regardless of the value of an image signal. A synchronizing signal (BD signal) for achieving synchronism with a main scanning line is detected in order to find the next main scanning line. Meanwhile, unblanking APC is executed to compensate for a variation of the intensity of light due to environmental effects. Thus, preparations are made for subsequent printing.

Figure 9A:
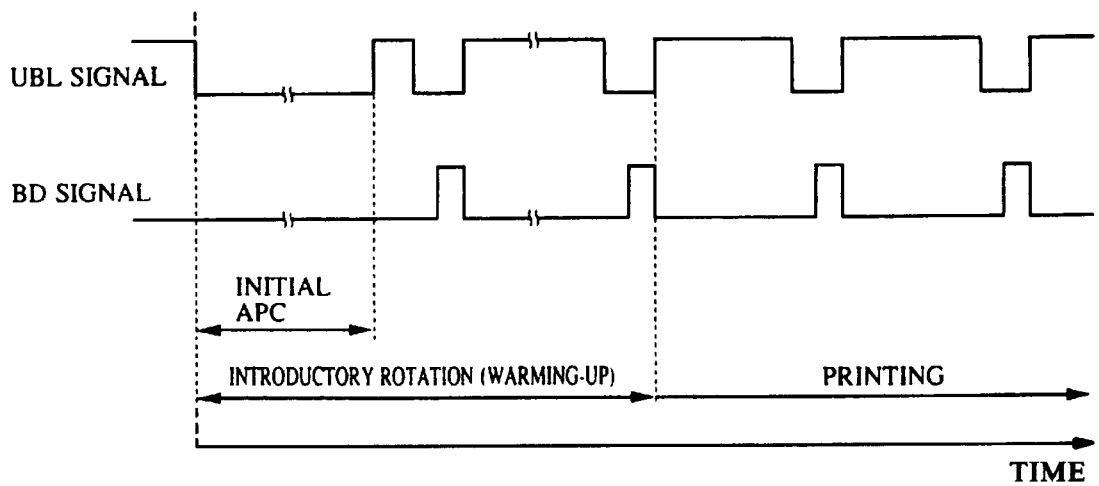
FIG. 9 is a timing chart showing timing of executing introductory rotation and printing.
Figure 9B:
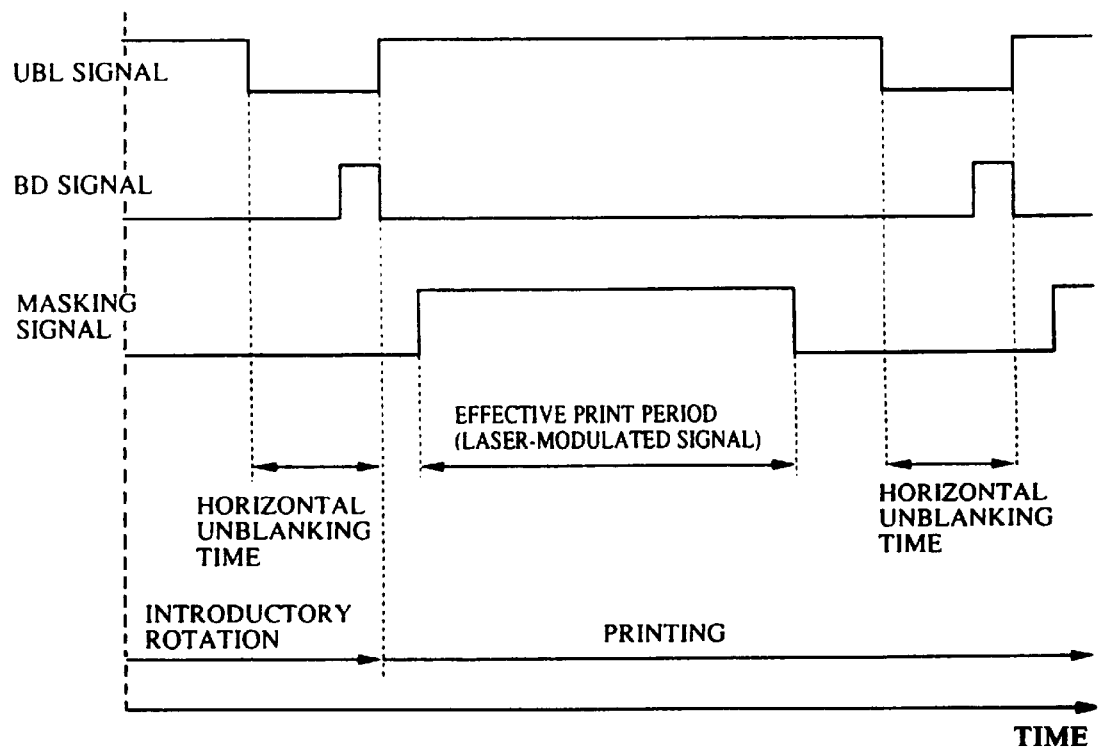

On the other hand, initial APC is, as shown in FIG. 9(a), achieved during printing (or recording) during which a BD signal has not been detected. The BD signal is therefore searched for a period of time that is longer than an unblanking period (corresponding to at least one main scanning line). Meanwhile, initial APC is executed so that the intensity of light emanating from the laser will have a value close to a given value. Thus, preparations are made for initial printing. However, as shown in FIG. 9(a) and as apparent from the previous description, during an introductory rotation period succeeding initial APC, since the BD signal has already been detected, the UBL signal causes the laser to be turned on forcibly during the same time interval as the one during an unblanking APC period. After initial APC is completed, a period of time corresponding to several hundreds of main scanning lines elapses before the first printing starts. For any time interval succeeding the completion of initial APC and preceding initial printing during introductory rotation, APC is carried out again in order to compensate for an error derived from initial APC. Moreover, assuming that the time interval needed for compensating for an error derived from initial APC is an unblanking period, the compensation is achieved according to the same sequence as the one for unblanking APC to be effected between sheets of print paper or colors.

FIG. 3 illustrates an error derived from APC in accordance with the present invention. In FIG. 3, T3 denotes an unblanking APC period. T4 denotes an initial APC period. Delta B ("ΔB") denotes an error derived from unblanking APC which is much smaller than the error derived from initial APC, delta A ("ΔA"), in FIG. 11. T1 denotes an effective monochrome print period for one sheet of print paper. VO denotes a target value of intensity. Vt denotes a set value of target reference intensity. As apparent from comparison with FIG. 11, an error derived from APC preceding initial printing is as small as delta B ("ΔB") which is the same as the error derived from unblanking APC.

Next, a representative initial APC sequence will be described.

Figures 4D, 4E, 4F:
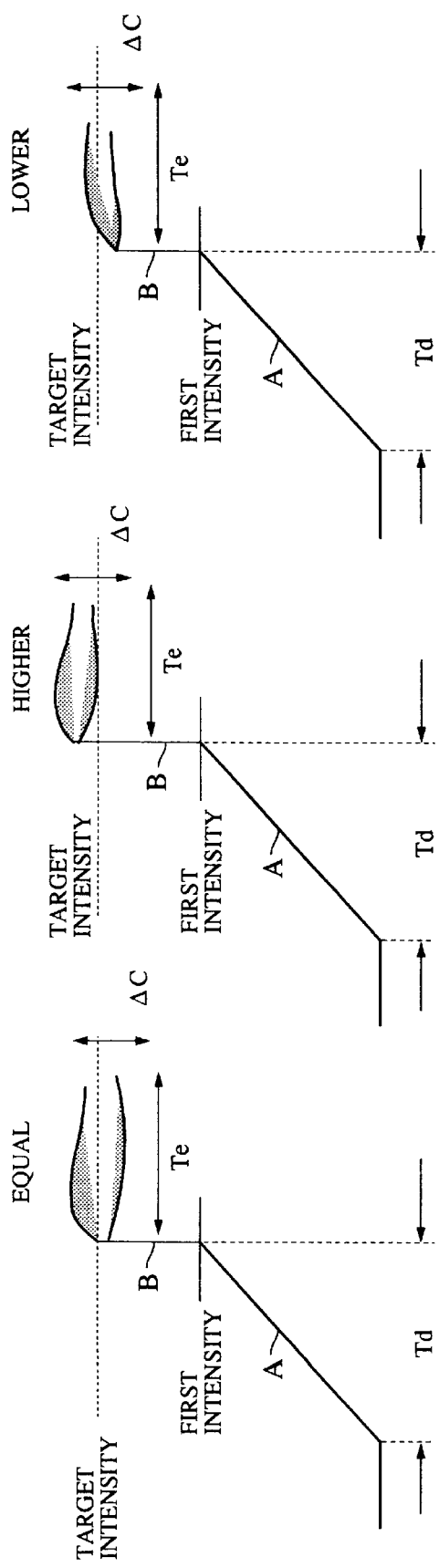
FIG. 4 is an explanatory diagram concerning initial APC in accordance with the present invention.

As apparent from the previous description, APC to be performed during pre-processing is composed of initial APC and APC compensation which are activated mutually independently within different time intervals during the pre-processing period. During initial APC, it is unnecessary to control the intensity of light so strictly as to bring the intensity of light very close to a target value. As long as the intensity of light is close to the target value, the intensity of light reaches the target value precisely during succeeding APC compensation. Any of FIGS. 4(a) to 4(f) shows an initial APC sequence and an error derived from APC, and illustrates how the intensity of light varies from the time of initial APC by the time of image formation achieved by initial printing after completion of initial APC. In FIGS. 4(a) to 4(f), Te denotes a pre-processing period succeeding initial APC and preceding initial printing. Delta C ("ΔC") denotes a variation of the intensity of light occurring during the pre-processing period succeeding initial APC and preceding initial printing. In FIG. 4(a), the intensity of light at the completion of initial APC is substantially equal to a target value. In FIG. 4(b), the intensity of light at the completion of initial APC exceeds the target value. In FIG. 4(c), the intensity of light at the completion of initial APC is lower than the target value.

In any of the cases illustrated, when initial APC alone is performed, the intensity of light varies in a duration from the completion of initial APC by the time of image formation achieved during initial printing. This is attributable to the droop characteristic of the laser.

Even compensating for the droop characteristic, it is effective to carry out initial APC compensation during pre-processing succeeding initial APC and preceding initial printing. From this viewpoint, initial APC should be performed in order merely to attain an intensity value close to a target value. In order to complete initial APC compensation within the pre-processing period, it is required to make the initial APC time as short as possible.

Until the intensity of light emanating from a laser reaches a given value smaller than a target value, the intensity of light is increased sequentially at a given rate. When the intensity of light reaches the given value, a set value of intensity required for reaching the target value is calculated using a rate of an intensity change made by that time. Based on the calculated set value, the intensity of light is changed from the given value to the target value over time. Owing to this sequence, the initial APC period Td can be made shorter than the initial APC period Ta or Tb in the prior art.

Next, FIGS. 4(d) to 4(f) show the same parameters as those in FIGS. 4(a) to 4(c) which are attained by executing initial APC compensation during a pre-processing period preceding initial printing and succeeding initial APC. In these drawings, APC compensation is assumed to provide the same control as unblanking APC. An error derived from initial APC compensation is the same as the one derived from APC shown in FIG. 3. The error, delta B ("ΔB"), is so small as to be negligible. Consequently, for continuous printing, the intensity of light emanating from a laser for initial printing becomes the same as the one for subsequent printing. For single-drum multi-rotation color printing, the intensity of light for printing the first color becomes the same as the one for printing the second color.

As described previously, according to the present invention, after initial APC is completed during introductory rotation, APC compensation is carried out during any time interval preceding subsequent printing. This sequence enables minimization of a variation of an error derived from initial APC.

Moreover, difference in print density between the first sheet of print paper and a subsequent sheet of print paper, or a difference in print density between colors in the first sheet of print paper which is made by a multi-rotation color printer, can be set to a fixed value. This leads to outstandingly improved print quality. In particular, for single-drum multi-rotation color image printing, no difference is made in color density between the first color and second color in the first sheet of print paper.

When initial APC compensation is performed according to the same technique as unblanking APC, an error resulting from using different techniques will be eliminated. Consequently, nearly ideal APC is realized.

Due to the droop characteristic of the laser, different techniques had been adopted for initial APC and unblanking APC. As previously mentioned, according to the droop characteristic, the temperature at a junction in a laser element changes due to transitional heat resistance in the laser element, so that even if the intensity of light reaches a target value at completion of each APC, the intensity of light at the time of printing following initial APC becomes different from the one at the time of printing following unblanking APC. The invention avoids this drawback as well.

In the aforesaid embodiment, software installed in the microcomputer 50 is used to control the intensity of light. Alternatively, hardware may be employed.

The present invention will not be restricted to the aforesaid embodiment but may be varied in various modes within the scope defined with the accompanying claims.

What is claimed is:

1. A color image recording apparatus having a semiconductor laser for successively recording a plurality of color components of a color image, comprising:

a first intensity stabilizing means for stabilizing the intensity of light emanating from said semiconductor laser within a given time interval during a pre-processing period preceding initial recording of a first color component of the color image; and a second intensity stabilizing means for correcting both the intensity of light emanating from said semiconductor laser during said pre-processing period succeeding intensity stabilization by said first intensity stabilizing means and the intensity of light emanating from said semiconductor laser during at least a portion of a blanking period between recording successive ones of the plurality of color components.

2. A recording apparatus according to claim 1, wherein:

within a given time interval during said preprocessing period preceding initial recording, said first intensity stabilizing means increases the intensity of light at a given rate sequentially until the intensity of light reaches a given value smaller than a target value;

when the intensity of light reaches said given value, said first intensity stabilizing means calculates a set value of intensity required for reaching said target value according to a rate of an intensity change made by that time; and said first intensity stabilizing means changes the intensity of light from said given value to said target value during a given time interval according to a calculated set value of intensity.

3. A recording apparatus according to claim 1, wherein:

said second intensity stabilizing means executes a same control sequence as that for stabilizing the intensity of light emanating from said semiconductor laser during a non-record period occurring between periods of recording a sheet of print paper.

4. A recording apparatus according to claim 1, wherein said second intensity stabilizing means executes a same sequence as the one for stabilizing the intensity of light emanating from said semiconductor laser during a non-record period during which recording is shifted from one of a plurality of areas to another area.

5. A recording apparatus according to claim 4, wherein said non-record period during which recording is shifted from one of a plurality of areas to another area is a non-record period during which recording is shifted from one color area to another color area in multi-rotation color image recording mode.

6. A recording apparatus according to claim 1, further comprising third intensity stabilizing means for stabilizing said intensity of light emanating from said semiconductor laser having a non-record period occurring between periods of recording a sheet of print paper, wherein said second intensity stabilizing means and said third intensity stabilizing means execute the same intensity stabilization control sequences.

7. A method of controlling the intensity of scanning light in a color image forming apparatus in which a photosensitive member is scanned with light modulated according to an image signal, comprising:
   a first step of turning on a light source of scanning light in order to illuminate at least the whole of one main scanning line before image formation based on the first color component, and controlling said light source according to said intensity of scanning light;
   a second step of controlling said light source according to said intensity of scanning light during scanning of a non-image scanning area before said image formation based on the first color component and after said intensity control of said first step; and
   a third step of controlling said light source according to said intensity of scanning light during scanning of a non-image scanning area between two cycles of image formation based on a color component.

8. A method according to claim 7, wherein at least one of said second and third steps is executed by a microcomputer in response to an interrupt request issued to said microcomputer and provided as a forced on signal.

9. A method according to claim 8, wherein at said second and third steps, an interrupt request is generated for each scanning line, and current flowing to said light source is increased or decreased by a given value with each interrupt.

10. A method according to claim 7, wherein said first step includes a step of calculating a rate of an intensity change made by said light source and caused by said increase in current, and also includes a step of controlling applied current so as to turn on said light source at said target value according to said intensity change rate.

11. A method according to claim 7, wherein at least one of said second and third steps includes a step of calculating an average or a sum of a plurality of detected values provided by performing intensity detection a plurality of times.

12. A light intensity control apparatus comprising:
   detecting means for detecting at least a characteristic of a light source;
   predicting means for predicting a current to be supplied to the light source corresponding to a target value of an intensity of light emanating from the light source, based on the detected characteristic of the light source; and
   correcting means for correcting a current supplied to the light source based on the target value and the intensity of the emanating light after a period of time during which the predicted current has been the current supplied to the light source.

13. A light intensity control apparatus according to claim 12, wherein said light source includes a semiconductor laser.

14. A light intensity control apparatus according to claim 12, wherein said detecting means detects a relation between the current supplied to the light source and the intensity of the emanating light.

15. A light intensity control apparatus according to claim 14, further comprising means for controlling the current supplied to the light source so as to vary the intensity of the emanating light gradually, and wherein said detecting means further comprises means for detecting a change ratio of the intensity of the emanating light with respect to a change in the current supplied to the light source.

16. A light intensity control apparatus according to claim 15, wherein said controlling means controls the current supplied to the light source so as to increase the intensity of the emanating light gradually until it reaches a predetermined level, which is less than the target value.

17. A light intensity control apparatus comprising:
   detecting means for detecting an intensity of light emanating from a light source due to a current supplied to the light source;
   determining means for determining a rate of a change of the light intensity due to a change of the current supplied to the light source;
   predicting means for predicting a current to be supplied to the light source corresponding to a target light intensity based on the detected intensity and the determined rate of change; and
   correcting means for correcting the current supplied to the light source based on the target light intensity and the detected intensity after a period of time during which the predicted current has been the current supplied to the light source.

18. A light intensity control apparatus according to claim 17, wherein said light source includes a semiconductor laser.

19. A light intensity control apparatus according to claim 17, wherein said determining means detects a relation between the current supplied to the light source and the intensity of the emanating light.

20. A light intensity control apparatus according to claim 19, further comprising means for controlling the current supplied to the light source so as to vary the intensity of the emanating light gradually, and the determining means further comprises means for detecting a change ratio of the intensity of the emanating light with respect to a change in the current supplied to the light source.

21. A light intensity control apparatus according to claim 20, wherein said controlling means controls the current supplied to the light source so as to increase the intensity of the emanating light gradually until it reaches a predetermined level, less than the target light intensity.

22. A light intensity control method, comprising the steps of:
   detecting an intensity of light emanating from a light source due to a current supplied to the light source;
   determining a rate of change of the detected intensity due to a change of the current supplied to the light source;
   predicting a current to be supplied to the light source that corresponds to a target light intensity, based on the determined rate of change;
   supplying the predicted current to the light source for a period of time; and correcting the current supplied to the light source based on the target light intensity and the detected intensity after the period of time during which the predicted current has been supplied to the light source.

23. The method according to claim 22, wherein the determining step includes the step of detecting a relation between the current supplied to the light source and the intensity of the emanating light.

24. The method according to claim 23, further comprising the step of controlling the current supplied to the light source so as to vary the intensity of the emanating light gradually, and the determining step further includes the step of detecting a change ratio of the intensity of the emanating light with respect to a change in the current supplied to the light source.

25. The method according to claim 24, wherein the controlling step includes the step of adjusting the current supplied to the light source so as so increase the intensity of the emanating light gradually until it reaches a predetermined level, less than the target light intensity.

26. A light intensity control method, comprising the steps of:

detecting an intensity of light emanating from a semiconductor laser due to a current supplied to the semiconductor laser;

determining a rate of change of the detected intensity due to a change of the current supplied to the semiconductor laser;

predicting a current to be supplied to the semiconductor laser that corresponds to a target light intensity, based on the determined rate of change;

supplying the predicted current to the semiconductor laser for a period of time; and correcting the current supplied to the semiconductor laser based on the target light intensity and the detected intensity after the period of time during which the predicted current has been supplied to the semiconductor laser.

27. The method according to claim 26, wherein the determining step includes the step of detecting a relation between the current supplied to the light source and the intensity of the emanating light.

28. The method according to claim 27, further comprising the step of controlling the current supplied to the light source so as to vary the intensity of the emanating light gradually, and the determining step further includes the step of detecting a change ratio of the intensity of the emanating light with respect to a change in the current supplied to the light source.

29. The method according to claim 28, wherein the controlling step includes the step of adjusting the current supplied to the light source so as so increase the intensity of the emanating light gradually until it reaches a predetermined level, less than the target light intensity.

30. A method of controlling a semiconductor laser for successively recording a plurality of color components of a color image, comprising:

a first intensity stabilizing step including the step of stabilizing the intensity of light emanating from the semiconductor laser within a given time interval during a pre-processing period preceding initial recording of a first color component of the color image; and a second intensity stabilizing step including the steps of correcting the intensity of light emanating from the semiconductor laser during the pre-processing period succeeding intensity stabilization during said first intensity stabilizing step, and correcting the intensity of light emanating from the semiconductor laser during at least a portion of a blanking period between recording successive ones of the plurality of color components.

31. The method according to claim 30, wherein:

within a given time interval during the pre-processing period preceding initial recording, said first intensity stabilizing step includes the step of increasing the intensity of light at a given rate sequentially until the intensity of light reaches a given value smaller than a target value;

when the intensity of light reaches the given value, said first intensity stabilizing step includes the step of calculating a set value of intensity required for reaching the target value according to a rate of an intensity change made by that time; and said first intensity stabilizing step includes the step of changing the intensity of light from the given value to the target value during a given time interval according to a calculated set value of intensity.

32. The method according to claim 30, wherein:

said second intensity stabilizing step includes the step of executing a same control sequence as that for stabilizing the intensity of light emanating from the semiconductor laser during a non-record period occurring between periods of recording a sheet of print paper.

33. The method according to claim 30, wherein said second intensity stabilizing step includes the step of executing a same sequence as the one for stabilizing the intensity of light emanating from the semiconductor laser during a non-record period during which recording is shifted from one of a plurality of areas to another area.

34. The method according to claim 33, wherein the non-record period during which recording is shifted from one of a plurality of areas to another area is a non-record period during which recording is shifted from one color area to another color area in multi-rotation color image recording mode.

35. The method according to claim 30, further comprising a third intensity stabilizing step including the step of stabilizing the intensity of light emanating from the semiconductor laser having a non-record period occurring between periods of recording a sheet of print paper, wherein said second intensity stabilizing step and said third intensity stabilizing step each include a step of executing the same intensity stabilization control sequences.

36. A color image forming apparatus in which a photosensitive member is scanned with light modulated according to an image signal, comprising:

a light source;

first control means for turning on said light source to produce scanning light in order to illuminate at least the whole of one main scanning line before image formation based on the first color component, and for controlling said light source according to the intensity of scanning light;

second control means for controlling said light source according to the intensity of scanning light during scanning of a non-image scanning area before the image formation based on the first color component and after the intensity control of said first control means; and third control means for controlling said light source according to the intensity of scanning light during scanning of a non-image scanning area between two cycles of image formation based on a color component.

37. The apparatus according to claim 36, wherein at least one of said second and third control means comprises a microcomputer acting in response to an interrupt request issued to said microcomputer and provided as a forced on signal.

38. The apparatus according to claim 37, wherein said second and third control means generate an interrupt request for each scanning line, and increase or decrease current flowing to said light source by a given value with each interrupt.

39. The apparatus according to claim 36, wherein said first control means calculates a rate of an intensity change made by said light source and caused by the increase in current, and also controls applied current so as to turn on the light source at the target value according to the intensity change rate.

40. The apparatus according to claim 36, wherein at least one of said second and third control means calculates an average or a sum of a plurality of detected values provided by performing intensity detection a plurality of times.

41. A light intensity control method comprising the steps of:

detecting at least a characteristic of a light source;

predicting a current to be supplied to the light source corresponding to a target value of an intensity of light emanating from the light source, based on the detected characteristic of the light source; and correcting a current supplied to the light source based on the target value and the intensity of the emanating light after a period of time during which the predicted current has been the current supplied to the light source.

42. The method according to claim 41, wherein said detecting step includes the step of detecting the characteristic of a semiconductor laser.

43. The method according to claim 41, wherein said detecting step includes the step of detecting a relation between the current supplied to the light source and the intensity of the emanating light.

44. The method according to claim 43, further comprising the step of controlling the current supplied to the light source so as to vary the intensity of the emanating light gradually, and wherein said detecting step further comprises the step of detecting a change ratio of the intensity of the emanating light with respect to a change in the current supplied to the light source.

45. A The method according to claim 44, wherein said controlling step includes the step of controlling the current supplied to the light source so as to increase the intensity of the emanating light gradually until it reaches a predetermined level, which is less than the target value.

46. A light intensity control apparatus, comprising:

means for detecting an intensity of light emanating from a semiconductor laser due to a current supplied to the semiconductor laser;

means for determining a rate of change of the detected intensity due to a change of the current supplied to the semiconductor laser;

means for predicting a current to be supplied to the semiconductor laser that corresponds to a target light intensity, based on the determined rate of change;

means for supplying the predicted current to the semiconductor laser for a period of time; and means for correcting the current supplied to the semiconductor laser based on the target light intensity and the detected intensity after the period of time during which the predicted current has been supplied to the semiconductor laser.

47. The apparatus according to claim 46, wherein the determining means includes means for detecting a relation between the current supplied to the light source and the intensity of the emanating light.

48. The apparatus according to claim 47, further comprising means for controlling the current supplied to the light source so as to vary the intensity of the emanating light gradually, and the determining means further includes means for detecting a change ratio of the intensity of the emanating light with respect to a change in the current supplied to the light source.

49. The apparatus according to claim 48, wherein the controlling means includes means for adjusting the current supplied to the light source so as so increase the intensity of the emanating light gradually until it reaches a predetermined level, less than the target light intensity.

\* \* \* \* \*

UNITED STATES PATENT AND TRADEMARK OFFICE
CERTIFICATE OF CORRECTION

PATENT NO. : 6,081,289
DATED : June 27, 2000
INVENTOR(S) : Yoshimi Ogasawa, et al.

It is certified that error appears in the above-identified patent and that said Letters Patent is hereby corrected as shown below:

Column 1
Line 19, "griper 103f" shoulkd read -- gripper 103f --.
Line 32, "rotation an axis" should read --rotation on an axis --.

Column 3
Line 34, "equals to" should read -- equals --.

Column 4
Line 43, "unblianking" should read -- unblanking --.
Line 56, "unblianking" should read -- unblanking --.

Column 5
line 3, "into" should read --of --.

Column 7
Line 52, "(step 61)" should be deleted.
Line 53, "is escaped." should read -- is exited. --.

Column 9
Line 26, "the." should read --the --.

Column 10
Line 9, "unblianking" should read -- unblanking --
Line 47, "preprocessing" should read -- pre-processing --.

UNITED STATES PATENT AND TRADEMARK OFFICE
CERTIFICATE OF CORRECTION

PATENT NO.   : 6,081,289
DATED        : June 27, 2000
INVENTOR(S)  : Yoshimi Ogasawa, et al.

It is certified that error appears in the above-identified patent and that said Letters Patent is hereby corrected as shown below:

Column 16
Line 1, "A" should be deleted.

Signed and Sealed this

Thirty-first Day of July, 2001

*Attest:*

*Attesting Officer*

NICHOLAS P. GODICI
*Acting Director of the United States Patent and Trademark Office*